United States Patent
Walker et al.

(10) Patent No.: US 12,536,302 B2
(45) Date of Patent: Jan. 27, 2026

(54) LIVE THREAT MODELING FRAMEWORK

(71) Applicant: Wells Fargo Bank, N.A., San Francisco, CA (US)

(72) Inventors: John Walker, Kannapolis, NC (US); Ankur Desai, Whitestone, NY (US)

(73) Assignee: Wells Fargo Bank, N.A., San Francisco, CA (US)

( * ) Notice: Subject to any disclaimer, the term of this patent is extended or adjusted under 35 U.S.C. 154(b) by 189 days.

(21) Appl. No.: 18/457,420

(22) Filed: Aug. 29, 2023

(65) Prior Publication Data

US 2025/0077679 A1 Mar. 6, 2025

(51) Int. Cl.
*G06F 21/00* (2013.01)
*G06F 8/77* (2018.01)
*G06F 21/57* (2013.01)

(52) U.S. Cl.
CPC .............. *G06F 21/577* (2013.01); *G06F 8/77* (2013.01); *G06F 2221/033* (2013.01)

(58) Field of Classification Search
CPC ..... G06F 21/577; G06F 8/77; G06F 2221/033
See application file for complete search history.

(56) References Cited

U.S. PATENT DOCUMENTS

| | | | | |
|---|---|---|---|---|
| 7,243,374 | B2* | 7/2007 | Howard | G06F 21/577 726/25 |
| 8,091,065 | B2* | 1/2012 | Mir | G06Q 10/06 726/22 |
| 2015/0347759 | A1* | 12/2015 | Cabrera | G06F 21/577 726/25 |
| 2017/0169230 | A1* | 6/2017 | Zheng | G06N 20/00 |
| 2019/0028498 | A1* | 1/2019 | Fach | H04L 63/1416 |
| 2020/0186563 | A1* | 6/2020 | Convertino | G06N 20/00 |
| 2021/0294901 | A1* | 9/2021 | Agarwwal | H04L 41/145 |

OTHER PUBLICATIONS

OWASP Foundation, Inc., "About the OWASP Foundation", www.owasp.org/about/, copyright 2023, 6 pages.
National Institute of Standards and Technology, "Cybersecurity Framework", accessed Aug. 29, 2023, 4 pages.
U.S. Appl. No. 18/456,777, filed Aug. 28, 2023.
U.S. Appl. No. 17/308,478, filed May 5, 2021.

\* cited by examiner

*Primary Examiner* — Ghazal B Shehni
(74) *Attorney, Agent, or Firm* — Merchant & Gould P.C.

(57) ABSTRACT

An example computer system for live threat modeling for an enterprise can include: one or more processors; and non-transitory computer-readable storage media encoding instructions which, when executed by the one or more processors, causes the computer system to: prepare abstracts for applications associated with the enterprise to form a threat model; monitor development phases of the applications; and apply the threat model to the applications during each of the development phases to identify risk.

16 Claims, 4 Drawing Sheets

LIVE THREAT MODELING FRAMEWORK

BACKGROUND

Threat modeling enables informed decision-making about application security risks associated with software. Such modeling can include creation of a prioritized list of security improvements to the design and implementation of applications. However, the security risks for applications are always evolving, which makes it difficult to prioritize and maintain a current state for the threat modeling.

SUMMARY

Examples provided herein are directed to a live threat modeling framework.

According to aspects of the present disclosure, an example computer system for live threat modeling for an enterprise can include: one or more processors; and non-transitory computer-readable storage media encoding instructions which, when executed by the one or more processors, causes the computer system to: prepare abstracts for applications associated with the enterprise to form a threat model; monitor development phases of the applications; and apply the threat model to the applications during each of the development phases to identify risk.

The details of one or more techniques are set forth in the accompanying drawings and the description below. Other features, objects, and advantages of these techniques will be apparent from the description, drawings, and claims.

DETAILED DESCRIPTION

This disclosure relates to a live threat modeling framework.

In the examples provided herein, the framework can be used by an enterprise to execute enterprise threat modeling processes, procedures and standards which are automatically updated. In these examples, the live threat modeling is automated as much as possible.

In the examples provided herein, the live threat modeling framework can focus on assessing applications within the enterprise to model the threats associated with those applications. This can include using the framework to analyze the possible impact of the threats, the potential severity of the threats, and/or mitigation strategies to reduce the threat surface via continuous refinement during design, build and deployment phases of the development of the applications. Further, the framework can be used to discover threats from external sources.

The example live threat modeling framework can be aligned with 6S, which is a system that promotes safety throughout the enterprise. In this system, the framework can exhibit one or more of the following characteristics.

Scalability: early security architecture review that can be repeatable, consistent, efficient, and compliant.

Skills: focused on domain, cyber, and external threats.

Security: provides as part of product design and frequency-based and ad-hoc measures, addressing various types of threats.

Stability: tailored to a hybrid approach that addressed both on-premises and cloud-based infrastructure.

Speed: uses tools that are automated where possible, semi-automated and/or sometimes manual to identify, catalog, and mitigate live threats to the enterprise.

Success: provides measurable statuses and outcomes, including severity ratings, security plans, and/or key performance/risk indicators.

Figure 1:
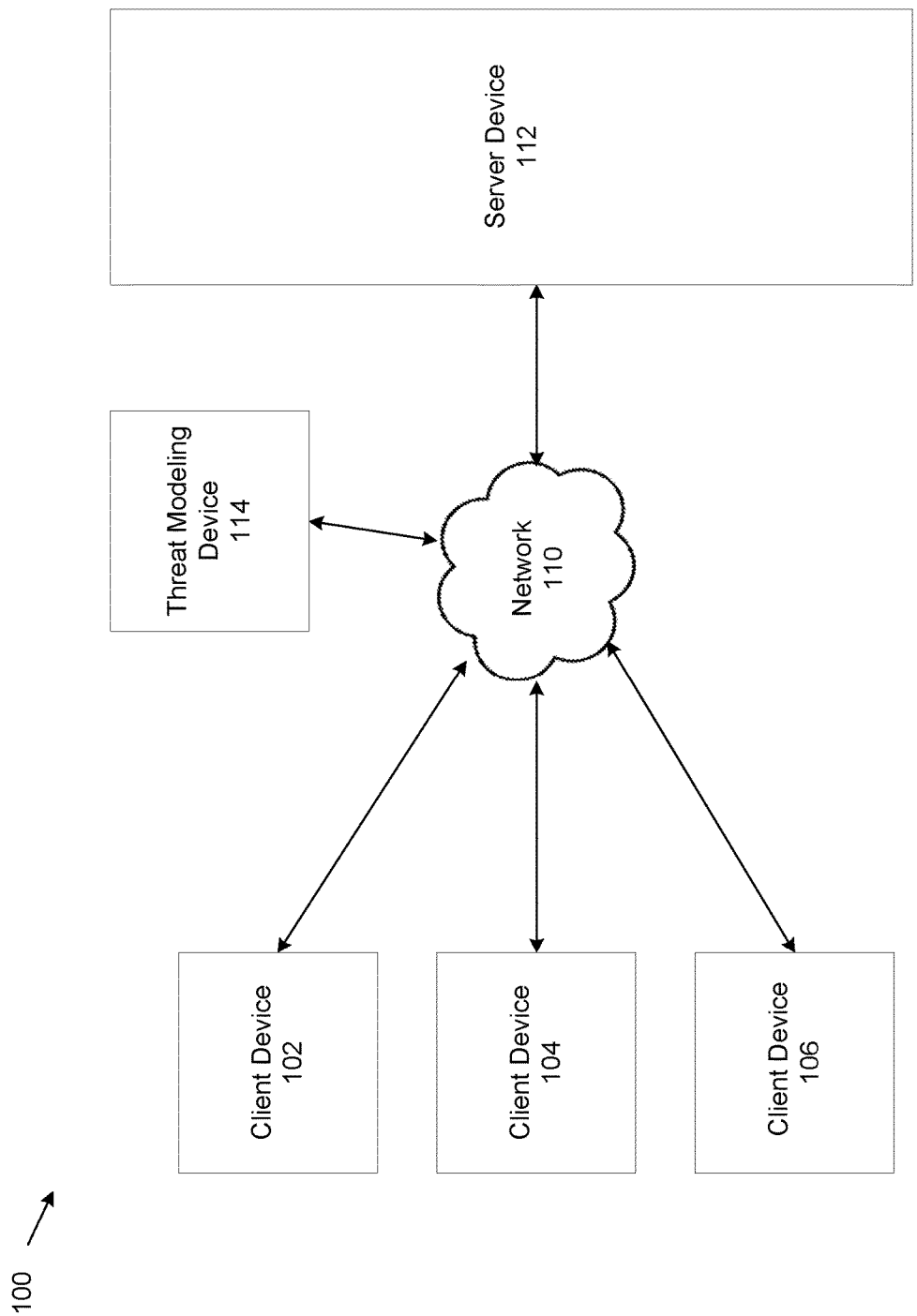
FIG. 1 shows an example system for providing a live threat modeling framework.

FIG. 1 schematically shows aspects of one example system 100 for an enterprise. The enterprise can be any type of business. In one non-limiting example, the enterprise is a financial institution that provides financial services to customers. However, the concepts described herein are equally applicable to other types of entities.

Generally, the system 100 includes a live threat modeling framework, which is described further below. The system 100 can include a plurality of client devices 102, 104, 106 and a server device 112. The client devices 102, 104, 106 communicate with the server device 112 to accomplish business tasks.

Each of the client devices 102, 104, 106 and the server device 112 may be implemented as one or more computing devices with at least one processor and memory. Example computing devices include a mobile computer, a desktop computer, a server computer, or other computing device or devices such as a server farm or cloud computing used to generate or receive data.

In the examples shown, the client devices 102, 104, 106 can be used by customers or employees of the enterprise to conduct business. The client devices 102, 104, 106 can communicate with the server device 112 through a network 110.

For instance, the example client device 102 can be programmed to design applications for products of the enterprise. The example client device 104 can be programmed to build those applications for the products of the enterprise. The example client device 106 can be programmed to deploy the applications for the products of the enterprise. Many other configurations for the client devices 102, 104, 106 are possible.

The server device 112 can be programmed to deliver functionality to the client devices 102, 104, 106. For example, in one embodiment, the server device 112 is formed by one or more computers (typically a server farm or part of a cloud computing environment) that facilitates the various business processes of the enterprise, including the design, build, and deployment phases of the various applications for the products of the enterprise.

As depicted, the system 100 also includes a threat modeling device 114 that provides live threat modeling. More specifically, the threat modeling device 114 is generally programmed to develop and maintain a live threat model framework for the system 100.

In this regard, the threat modeling device 114 is programmed to monitor threats associated with the applications that are designed, built, and deployed for the products of the enterprise. This can include development of abstracts of the applications to form the live threat model(s). An abstract can define such aspects as: (i) build information for the application, such as code type, versioning, etc.; (ii) functionality associated with the application; (iii) dependencies associated with the application; etc.

The example threat modeling device 114 can also be programmed to identify live threat information and apply that information to the abstracts of the applications in the threat model for the enterprise. For instance, the threat modeling device 114 can identify threats in near real-time and apply those threats to the applications of the enterprise. This allows the threat modeling device 114 to adapt as the threats evolve. This can also involve capturing incremental changes to the applications and threats and identifying risks associated therewith.

For example, the threat modeling device 114 can include or more databases that house threat models for the applications of the enterprise. As information regarding threats is obtained, that information can be stored in models within the database and automatically updated in near-real time, such as every minutes, every hour, etc. This allows the threat modeling device 114 to access the updated threat models and apply them to the applications during the lifecycle of the application, including design, build, and deployment phases.

For instance, the threat modeling device 114 can be programmed to consume threat information from different sources. Such sources can be structured in various manners such as, without limitation, according to the Open Worldwide Application Security Project and/or the Cybersecurity Framework from the National Institute of Standards and Technology.

In one example, the threat modeling device 114 is application programming interface (API) driven, so that the threat modeling device 114 can access live threat information through APIs. Such a configuration is provided in U.S. patent application Ser. No. 18/456,777, filed on Aug. 28, 2023, the entirety of which is hereby incorporated by reference.

In addition, the threat modeling device 114 can assist in remediation and reporting associated with the threats for the enterprise. For example, once a threat is identified, the threat modeling device 114 can be programmed to use standard and/or custom tools or catalogs for the system 100 to address the threat. For instance, the threat modeling device 114 can be programmed to access patches available from vendors to address the threats. Many other configurations are possible.

In the examples provided below, the threat modeling device 114 can be integrated into the system 100, such as in a cloud computing environment that allows the threat modeling device 114 to communicate with the computing devices associated with the enterprise. This can include automation of the threat modeling device 114, so that the functionality described with reference to FIG. 2 can be automated.

Figure 2:
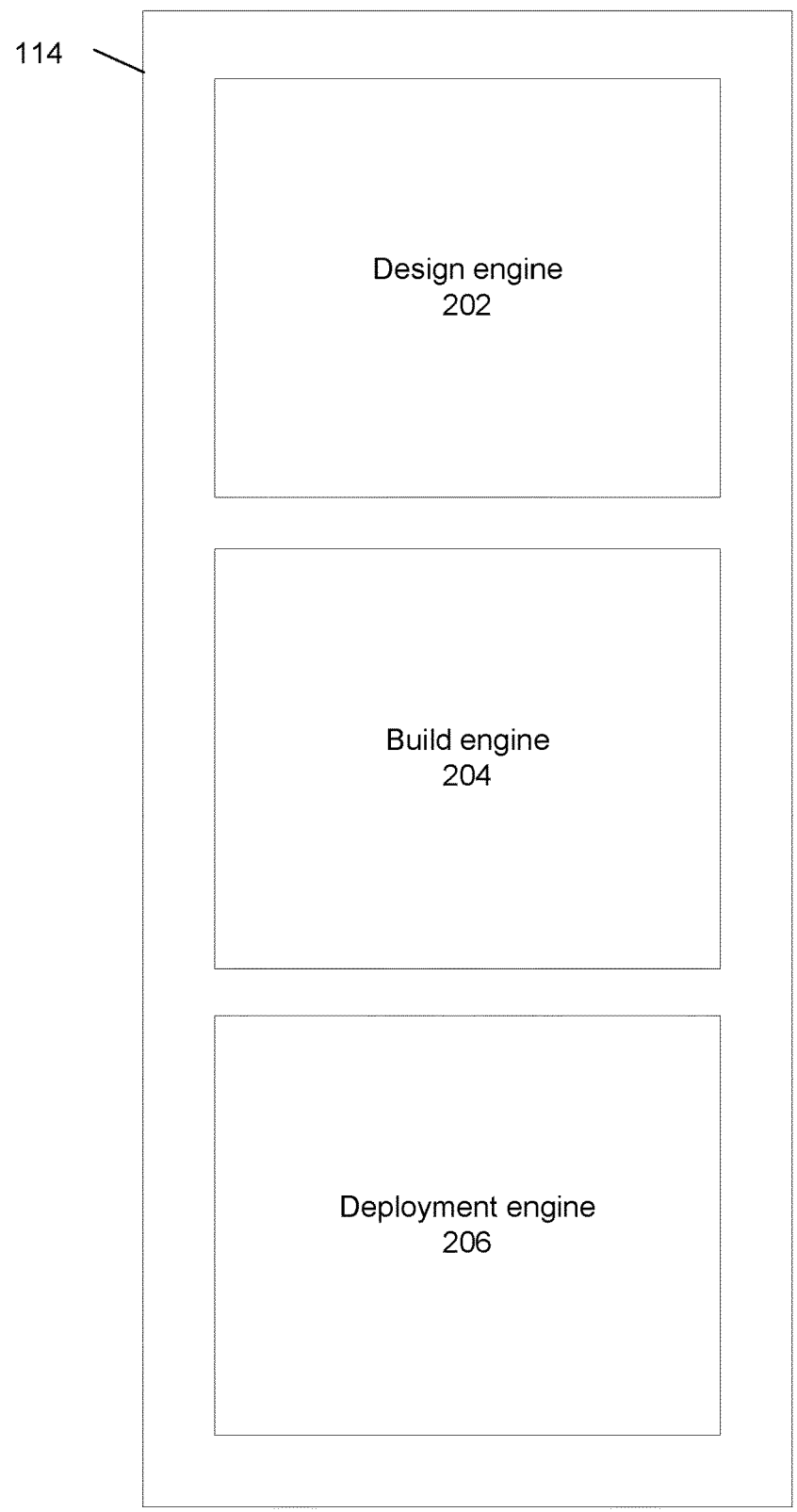
FIG. 2 shows example logical components of a live threat modeling device of the system of FIG. 1.

Referring now to FIG. 2, additional details on the threat modeling device 114 are provided. In this example, the threat modeling device 114 includes a design engine 202, a build engine 204, and a deployment engine 206.

The example design engine 202 is programmed to receive input from various applications used to develop the applications that are implemented in the products of the system 100 for the enterprise. For instance, the design engine 202 is programmed to interface with the client device 102, which can be used by a product owner, developer, and/or engineer who designs products for the system 100. The design engine 202 can be programmed to receive information associated with the design of the products, including the creation and modification of source code stored in a GitHub associated with the enterprise during the design of one or more applications.

For instance, the design engine 202 can monitor the design of new and existing applications and continually update the abstract associated with the application in the threat model as the application is designed. As functionality associated with the application is designed and modified, the design engine 202 monitors the design in near real-time to identify and potentially mitigate threats.

The example build engine 204 is programmed to monitor the building of the applications for the products of the enterprise, including resources to compile and execute the source code. This can include services like building, inspecting, publishing, and scanning of the code in conjunction with the creation of the applications. As the applications are built, the build engine 204 monitors the builds in near real-time to identify and potentially mitigate threats.

The example deployment engine 206 is programmed to monitor the deployment of the applications for the products of the enterprise. This can include services like moving the applications for the various products into a production environment and the integration thereof, including Unix, iOS, and/or Android. As the applications are deployed, the deployment engine 206 monitors the deployments in near real-time to identify threats.

The threat modeling device 114 can be programmed to perform this functionality in various manners. For instance, the design engine 202 can monitor as code is being written and identify (e.g., highlight) sections of code that might be vulnerable to threats. Similarly, the build engine 204 can be programmed to identify sections of code that may be vulnerable when code is checked into and/or compiled by the server device 112. Further, the deployment engine 206 can be programmed to flag an application that is vulnerable once the application is deployed and/or executed in the production environment.

In alternative embodiments, the threat modeling device 114 can embed the artificial intelligence capabilities to identify threats based on patterns identified on client devices 102, 104, 106 or server device 112. Many other configurations are possible.

Figure 3:
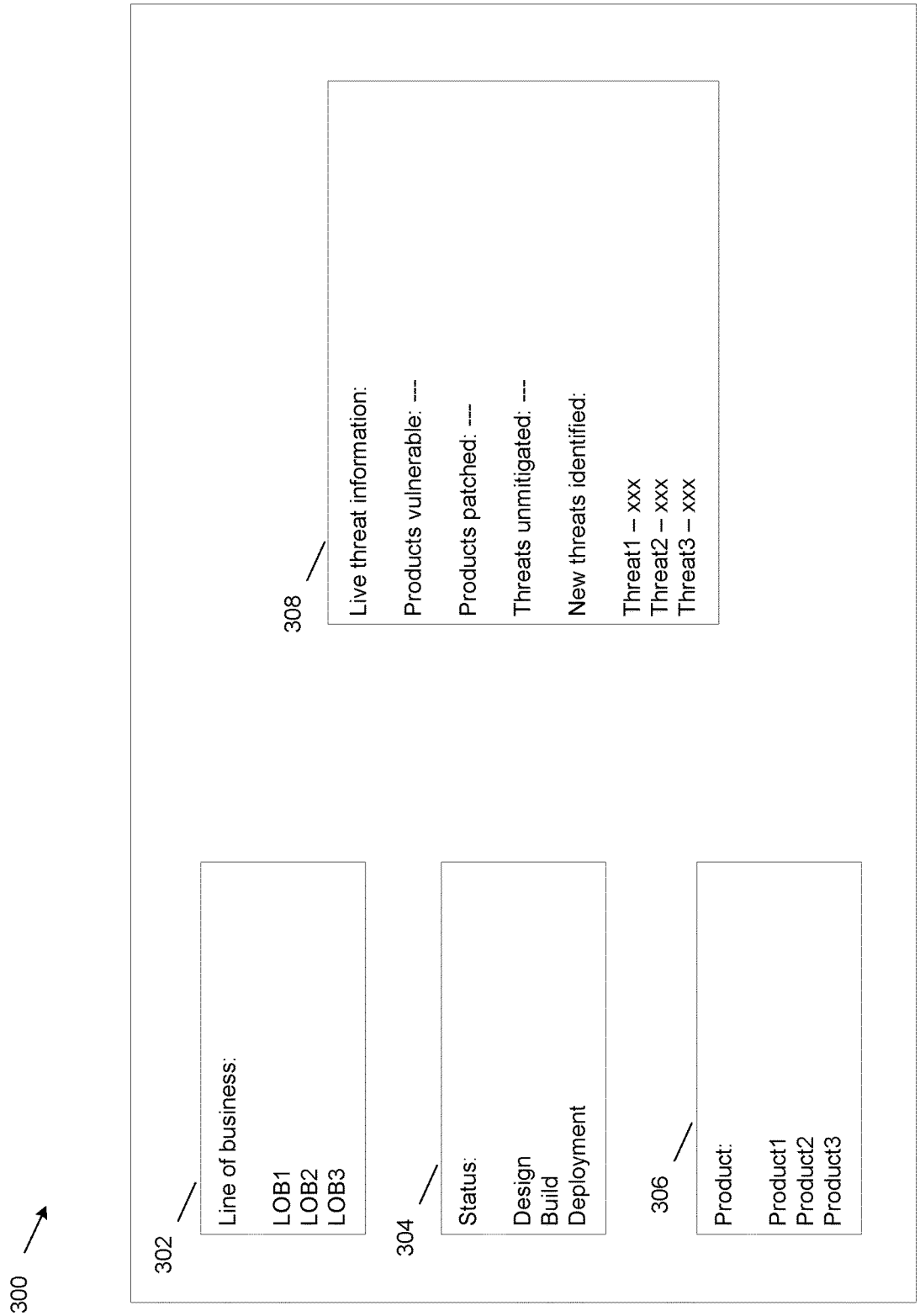
FIG. 3 shows an example dashboard generated by the live threat modeling device of FIG. 2.

Referring now to FIG. 3, an example dashboard 300 that can be generated by the threat modeling device 114 is shown. In this example, the dashboard 300 is programmed to report on the live threat modeling for the system 100 of the enterprise. Further, the dashboard 300 can be configurable to display information that is relevant to a user of the dashboard 300, such as a product owner, manager, or cybersecurity analysist.

In this example, the dashboard 300 includes various selection menus 302, 304, 306 that modify the threat information that is displayed on a live threat module 308. In this manner, the dashboard 300 can be tailored to provide information that is relevant to the user.

For instance, the menu 302 allows for receipt of selection between various lines of business for the enterprise. For instance, one or more of the lines of business are selectable, and the threat information in the live threat module 308 is modified to provide information on the threats associated with the applications/products for the selected lines of business. Similarly, specific products are selectable using the menu 306, and the threat information in the live threat module 308 is modified to provide information on the threats associated with the selected applications/products.

Further, the menu 304 allows for selection of the desired phases associated with the design, building, and deployment phases of the applications. For instance, each phase is selectable to modify the information on the threats provided by the live threat module 308 to correspond to the selected phases.

The live threat module 308 provides a summary of the status of the threats associated with the system 100 based upon the selections provided by the menus 302, 304, 306. In example embodiments, the live threat module 308 is programmed to provide a real-time assessment of the live threats for the system 100. The live threat module 308 can be updated automatically based upon the selections in the menus 302, 304, 306 and the changing environment associated with the system 100.

For instance, the live threat module 308 can display the products/applications that currently are vulnerable based upon the threats that exist within the live threat model. Products that have been recently patched and threats that are unmitigated can also be included in the live threat module 308. Finally, a list of new threats that have been recently identified can be provided on the live threat module 308. Many other configurations and information can be provided.

Figure 4:
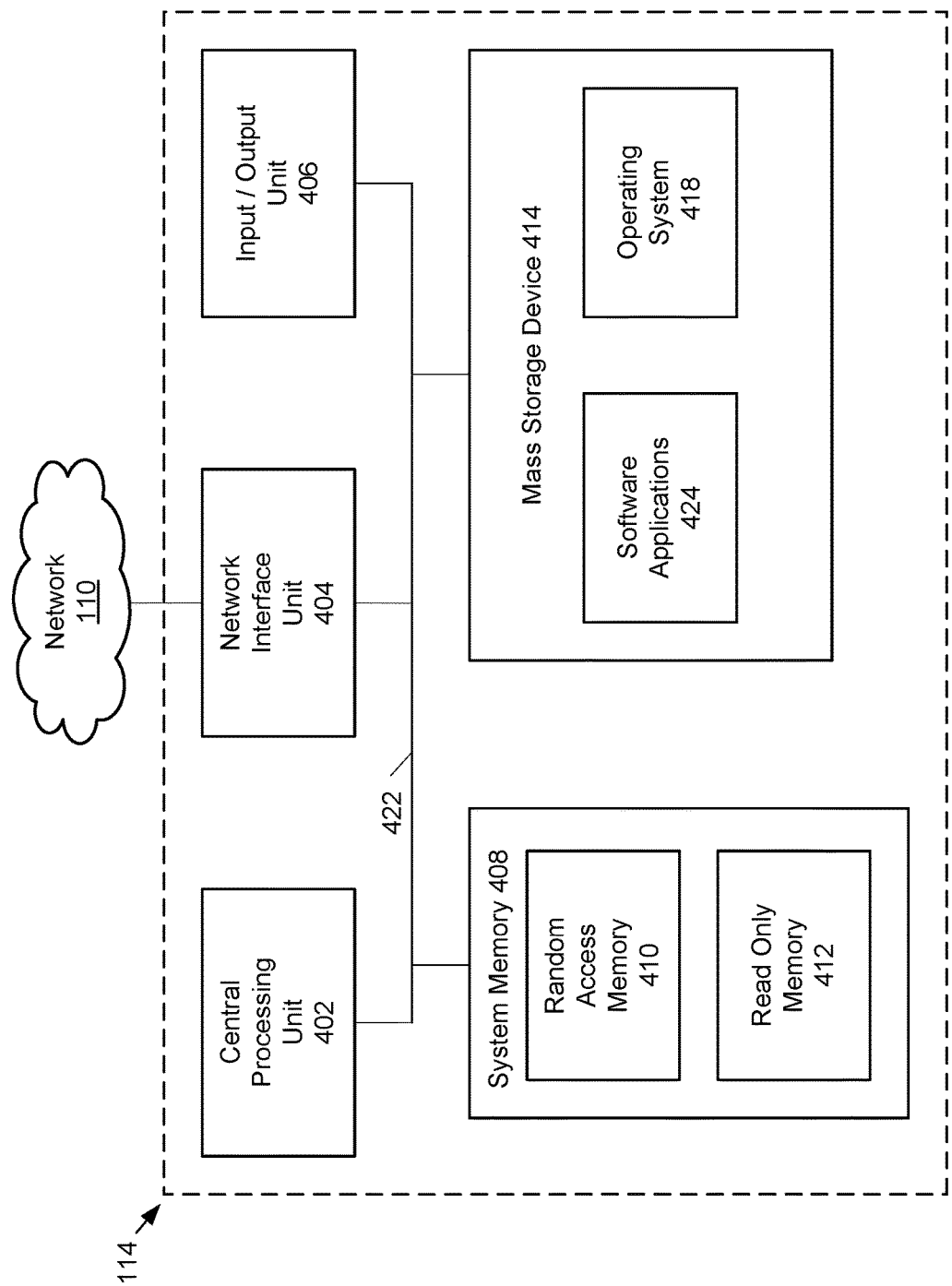
FIG. 4 shows example physical components of the live threat modeling device of FIG. 2.

As illustrated in the embodiment of FIG. 4, the example threat modeling device 114 can include at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system containing the basic routines that help transfer information between elements within the threat modeling device 114, such as during startup, is stored in the ROM 412. The threat modeling device 114 further includes a mass storage device 414. The mass storage device 414 can store software instructions and data. A central processing unit, system memory, and mass storage device similar to that in FIG. 4 are also included in other computing devices disclosed herein (e.g., the devices 102, 104, 106, 112).

The mass storage device 414 is connected to the CPU 402 through a mass storage controller (not shown) connected to the system bus 422. The mass storage device 414 and its associated computer-readable data storage media provide non-volatile, non-transitory storage for the threat modeling device 114. Although the description of computer-readable data storage media contained herein refers to a mass storage device, such as a hard disk or solid-state disk, it should be appreciated by those skilled in the art that computer-readable data storage media can be any available non-transitory, physical device, or article of manufacture from which the central display station can read data and/or instructions.

Computer-readable data storage media include volatile and non-volatile, removable, and non-removable media implemented in any method or technology for storage of information such as computer-readable software instructions, data structures, program modules, or other data. Example types of computer-readable data storage media include, but are not limited to, RAM, ROM, EPROM, EEPROM, flash memory or other solid-state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the threat modeling device 114.

According to various embodiments of the invention, the threat modeling device 114 may operate in a networked environment using logical connections to remote network devices through network 110, such as a wireless network, the Internet, or another type of network. The threat modeling device 114 may connect to network 110 through a network interface unit 404 connected to the system bus 422. It should be appreciated that the network interface unit 404 may also be utilized to connect to other types of networks and remote computing systems. The threat modeling device 114 also includes an input/output controller 406 for receiving and processing input from a number of other devices, including a touch user interface display screen or another type of input device. Similarly, the input/output controller 406 may provide output to a touch user interface display screen or other output devices.

As mentioned briefly above, the mass storage device 414 and the RAM 410 of the threat modeling device 114 can store software instructions and data. The software instructions include an operating system 418 suitable for controlling the operation of the threat modeling device 114. The mass storage device 414 and/or the RAM 410 also store software instructions and applications 424, that when executed by the CPU 402, cause the threat modeling device 114 to provide the functionality of the threat modeling device 114 discussed in this document.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. A computer system for live threat modeling for an enterprise, comprising:
   one or more processors; and
   non-transitory computer-readable storage media encoding instructions which, when executed by the one or more processors, causes the computer system to:
   prepare abstracts for applications associated with the enterprise to form a threat model, wherein the abstracts are dynamic structured data representations of the applications throughout development phases of the applications;
   monitor the development phases of the applications;
   apply the threat model to incremental changes to the applications as defined by the abstracts during each of the development phases to identify risk; and
   automatically update the threat model through one or more calls to an application programming interface in near-real time using the abstracts.

2. The computer system of claim 1, wherein the abstracts define build information for the applications, functionality associated with the applications, and dependencies associated with the applications.

3. The computer system of claim 1, wherein the threat model is stored in a database, and the database is automatically updated.

4. The computer system of claim 1, wherein the development phases include:
   a design phase during which the applications are coded;
   a build phase during which the applications are compiled; and
   a deployment phase during which the applications are introduced into a production environment.

5. The computer system of claim 1, comprising further instructions which, when executed by the one or more processors, causes the computer system to generate a dashboard to provide threat information associated with the enterprise.

6. The computer system of claim 5, wherein the dashboard includes one or more menus to filter the threat information.

7. The computer system of claim 6, wherein the one or more menus include a first menu to filter by line of business and a second menu to filter by one or more of the applications.

8. The computer system of claim 1, comprising further instructions which, when executed by the one or more processors, causes the computer system to mitigate the risk associated with the applications.

9. A method for live threat modeling for an enterprise, comprising:
preparing abstracts for applications associated with the enterprise to form a threat model, wherein the abstracts are dynamic structured data representations of the applications throughout development phases of the applications;
monitoring the development phases of the applications;
applying the threat model to incremental changes to the applications as defined by the abstracts during each of the development phases to identify risk; and
automatically updating the threat model through one or more calls to an application programming interface in near-real time using the abstracts.

10. The method of claim 9, wherein the abstracts define build information for the applications, functionality associated with the applications, and dependencies associated with the applications.

11. The method of claim 9, wherein the threat model is stored in a database, and the database is automatically updated.

12. The method of claim 9, wherein the development phases include:
a design phase during which the applications are coded;
a build phase during which the applications are compiled; and
a deployment phase during which the applications are introduced into a production environment.

13. The method of claim 9, further comprising generating a dashboard to provide threat information associated with the enterprise.

14. The method of claim 13, wherein the dashboard includes one or more menus to filter the threat information.

15. The method of claim 14, wherein the one or more menus include a first menu to filter by line of business and a second menu to filter by one or more of the applications.

16. The method of claim 9, further comprising mitigating the risk associated with the applications.

* * * * *